J. Gallatin, Jr.
Mandrel.
Nº 112,580.  Patented Mar. 14, 1871.
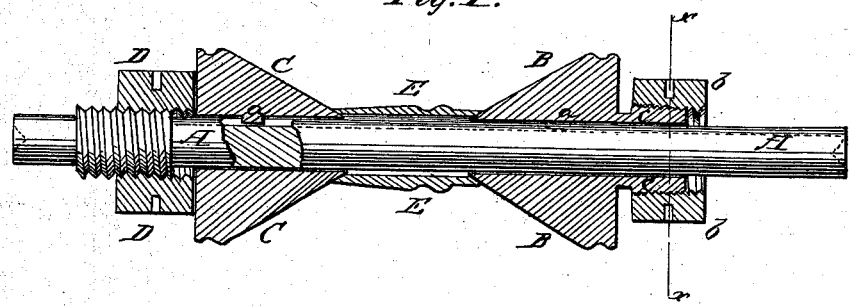
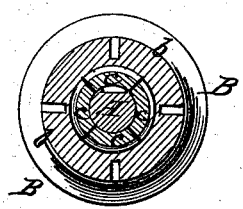
Witnesses:
A. Bennecsendorf
Alex. F. Roberts
Inventor:
J. Gallatin Jr.
per: Munn &
Attorneys.

UNITED STATES PATENT OFFICE.

JAMES GALLATIN, JR., OF NEW YORK, N. Y.

IMPROVEMENT IN UNIVERSAL MANDRELS.

Specification forming part of Letters Patent No. 112,580, dated March 14, 1871.

*To all whom it may concern:*

Be it known that I, JAMES GALLATIN, Jr., of the city, county, and State of New York, have invented a new and Improved Universal Mandrel for Lathes; and I do hereby declare that the following is a full, clear, and exact description thereof, which will enable others skilled in the art to make and use the same, reference being had to the accompanying drawing, forming part of this specification, in which—

Figure 1 represents a vertical longitudinal section of my universal mandrel. Fig. 2 is a vertical transverse section of the same, taken on the plane of the line $x\,x$, Fig. 1.

Similar letters of reference indicate corresponding parts.

The object of this invention is to provide a universal mandrel which can be placed into lathes to retain different-sized tubular articles in exact central positions. Heretofore, for every different-bored article a different-sized mandrel was required. To prevent this I arrange two cones upon a mandrel and make at least one of them longitudinally adjustable, so that all articles whose bore is larger than the diameter of the mandrel can be held in place by the small ends of the cones, which are forced into the ends of such tube and then clamped. The cones will serve to exactly center the tube, and to, at the same time, lock the same to the mandrel.

A in the drawing represents the mandrel, which is centered and held in the lathe. Upon the mandrel are fitted two hollow cones, B C, set with their small ends toward each other, and prevented from revolving on the mandrel by groove and feather $a$, or other equivalent means. One cone, B, is securely fixed to the mandrel by a nut, $b$, which is fitted upon the split shank $c$ of B. The other cone, C, can be forced toward the cone B by a nut, $d$, screwed upon the mandrel.

The article E to be held and centered is slipped upon the mandrel when the cone B is off, and is held against the end of the cone C. The cone B is then put on and locked fast. The nut D is finally turned to force the cone C forward, and to cause thereby the two cones to lock the tube E.

All different-sized articles can by this arrangement be held and properly centered on the mandrel.

I am aware that cones have already been used to clamp and hold hollow articles on different machines, and I do not claim their use *per se*, my invention consisting in the construction of a universal mandrel for lathes, whereby the necessity of using a separate mandrel for the various-sized tubes is dispensed with.

Having thus described my invention, I claim as new and desire to secure by Letters Patent—

As my improvement in universal mandrels of the species herein described, the split, tapered, and screw-threaded extremity $c$ of the cone B, jointly with the nut $b$.

JAMES GALLATIN, JR.

Witnesses:
GEO. W. MABEE,
ALEX. F. ROBERTS.